UNITED STATES PATENT OFFICE.

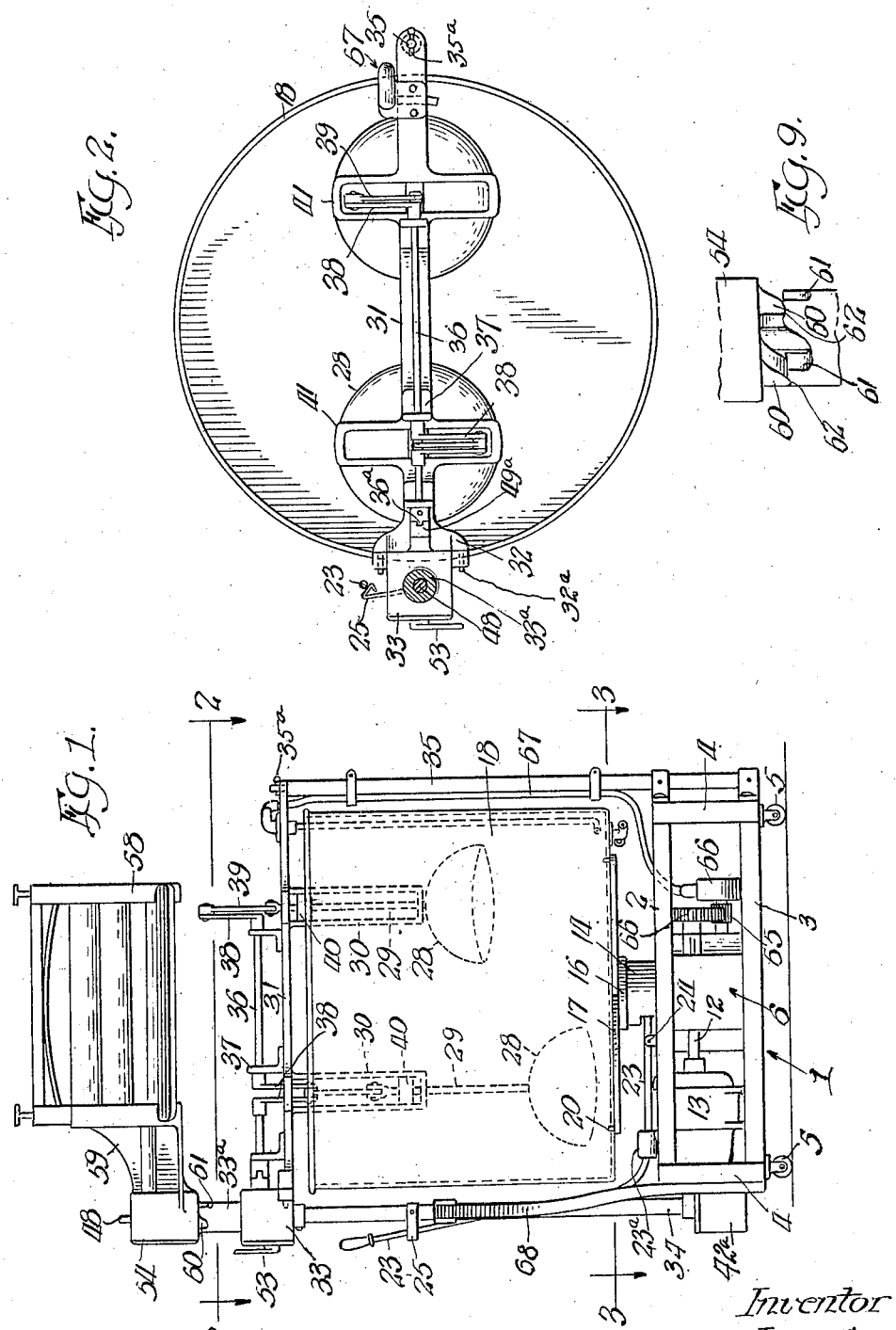

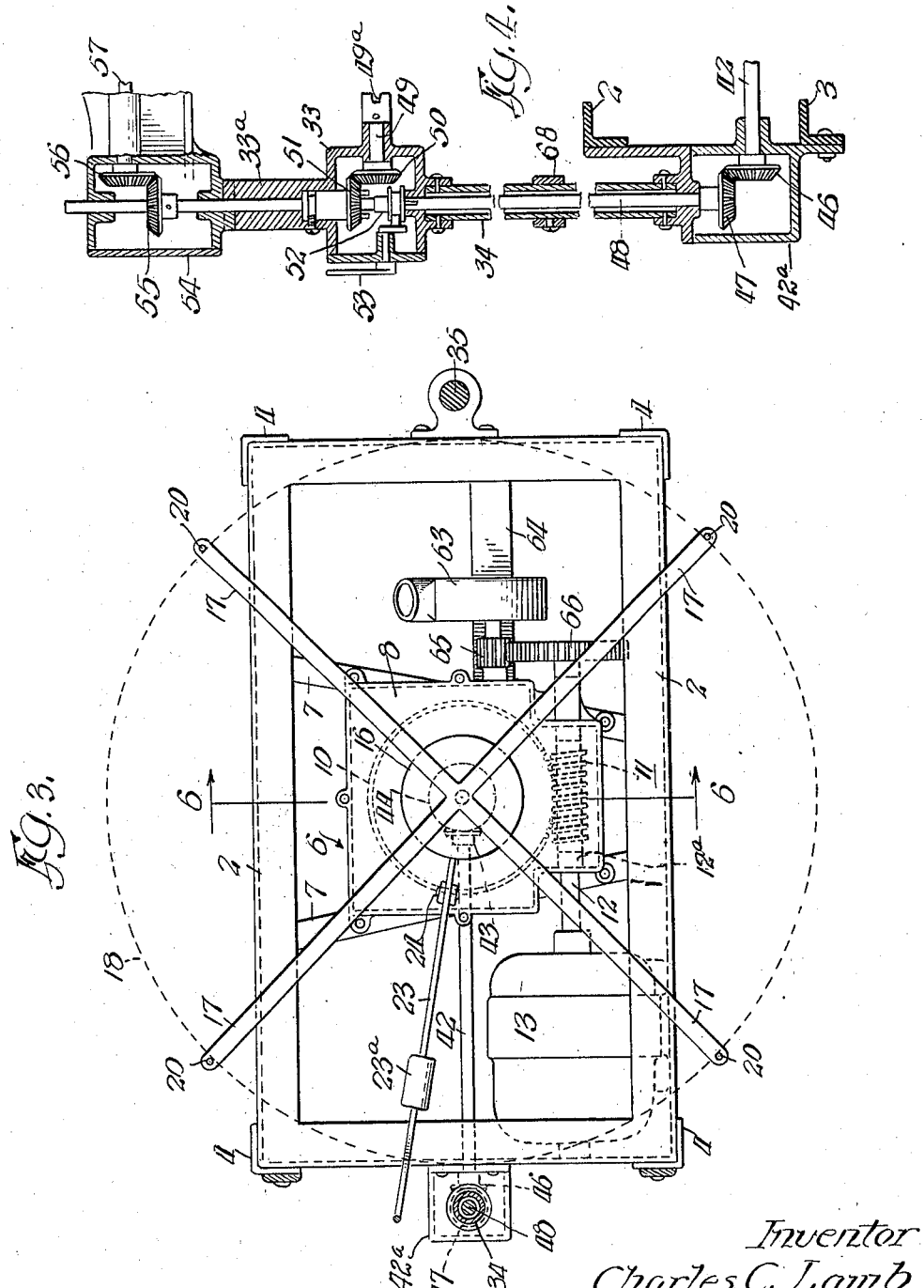

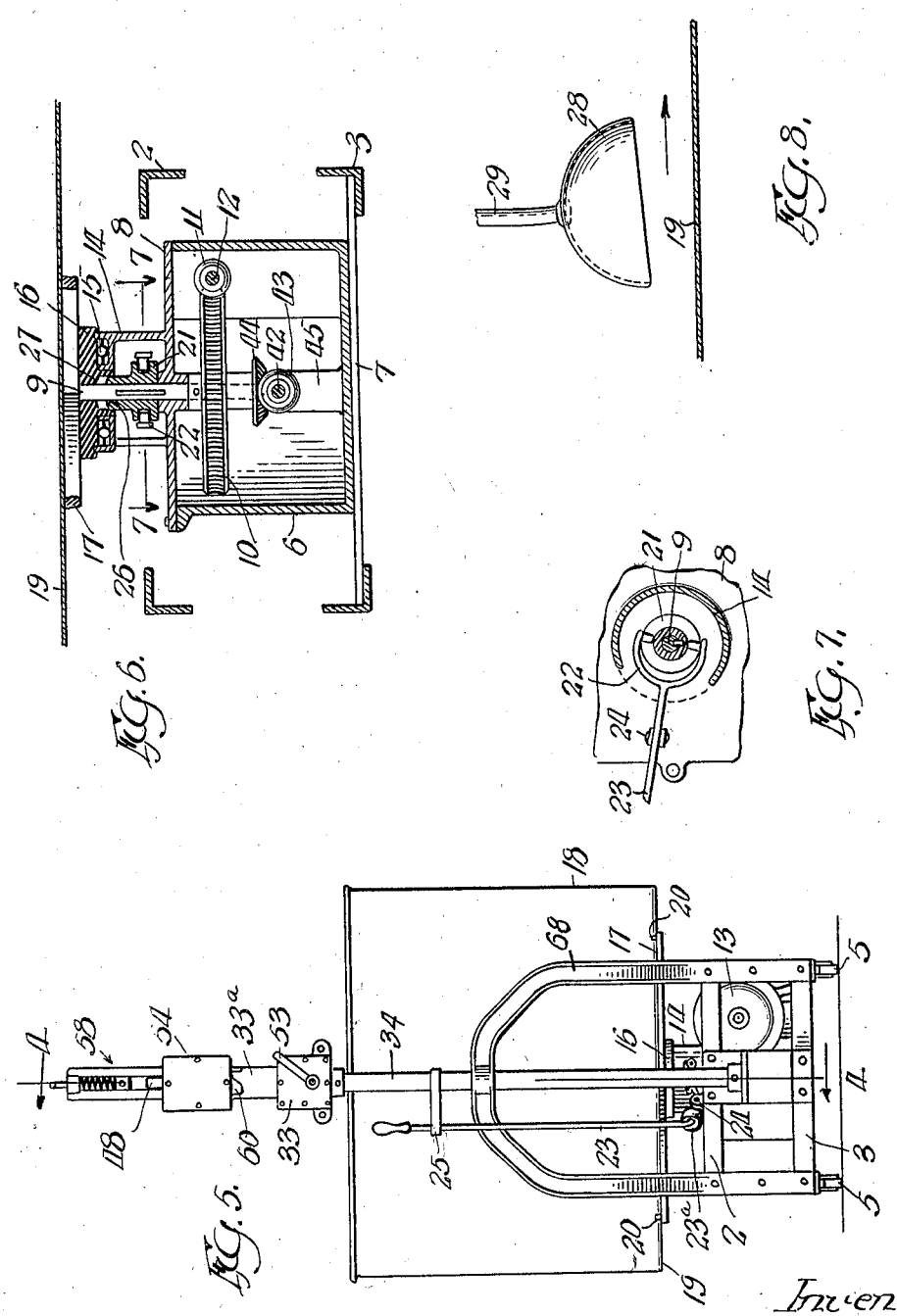

CHARLES CALVERT LAMB, OF CHICAGO, ILLINOIS.

WASHING-MACHINE.

1,385,692.  Specification of Letters Patent.  Patented July 26, 1921.

Application filed October 4, 1920. Serial No. 414,473.

*To all whom it may concern:*

Be it known that I, CHARLES C. LAMB, a citizen of the United States, residing at Chicago, in the county of Cook and State of Illinois, have invented new and useful Improvements in Washing-Machines, of which the following is a specification.

This invention relates to washing machines and more particularly to the gearing therefor, and consists in the matters hereinafter described and more particularly pointed out in the appended claims.

In the accompanying drawings—

Figure 1 is a side elevational view of a washing machine constructed in accordance with my invention;

Fig. 2 is a horizontal top plan section taken above the tub on line 2—2 of Fig. 1;

Fig. 3 is an enlarged horizontal sectional view taken below the tub on line 3—3 of Fig. 1;

Fig. 4 is a vertical sectional view taken on line 4—4 of Fig. 5;

Fig. 5 is an end view of said machine;

Fig. 6 is a vertical sectional view taken through the gear box on line 6—6 of Fig. 3;

Fig. 7 is a horizontal sectional view taken on line 7—7 of Fig. 6;

Fig. 8 is a view of one of the pounders, showing the angle at which it is arranged to the bottom of the tub; and Fig. 9 is a fragmentary view of a detail of construction to be hereinafter described.

The washing machine of my invention has a supporting base or stand 1, made of upper and lower open rectangular frames 2 and 3, connected at the corners by angle bars 4. The stand has casters 5 so that the machine may be rolled over the floor.

Located within and between the top and bottom frames is a gear box 6 centrally arranged and supported by the lower frame 3 on cross-bars 7, as shown in Figs. 3 and 6. The box 6 has a lid 8, in which is journaled the vertically arranged main operating shaft 9 extending through and above the lid. Secured to the shaft inside of the box is a worm gear 10 in mesh with a worm 11 also in the box and fixed to a shaft which is coupled to the armature shaft 12 of an electric motor 13 at one side of said box. The shaft 12 extends into the box 6, and the motor 13 is rigidly secured to and supported by the lower frame 3. The coupling 12ª between the armature shaft 12 and the shaft on which the worm 11 is mounted is inside of the gear box, as shown by dotted lines in Fig. 3. The casing of the motor 13 is located closely adjacent the end and side portions of the frames 2, 3, thus preventing the motor from being readily uncoupled from the worm shaft and being removed from the stand, thereby preventing theft of the motor because the entire machine must be taken down to release the motor.

The lid 8 has an upwardly extending web or bracket 14, formed at its upper end to provide a raceway for bearing balls 15, on which rests an annular block or collar 16 rigidly secured to the under side of the spider arms 17. These arms are radially arranged, as shown in Fig. 3, and constitute the supporting member for the tub 18, the bottom wall 19 of which rests on the arms. The tub can be removed from the arms by merely lifting the tub off of the arms, and this is done whenever it is necessary. The weight of the tub holds it on the arms, and the latter each have a vertical pin or lug 20 at the outer end to extend over the outside of the tub and hold the tub from displacement when on said arms.

The shaft 9 extends loosely into the collar 16, and on the shaft between the bearing 15 and the lid 8 is a clutch sleeve 21. This sleeve is splined on the shaft and is provided with an annular groove to receive the forked ends of a shifting yoke 22, as shown in Fig. 7. The bracket 14 is open at one side to allow the yoke to extend into the same, as shown in said figure. The yoke is at the inner end of a lever 23, pivoted on the gear box at 24 and bent upwardly to extend on the outside of the tub, as shown in the drawings. The upper end of the lever 23 is provided with a handle so that it may be readily grasped, and there is a latch member 25 secured to a fixed part of the machine to hold the lever out of clutch position. The clutch sleeve 21 works through the upper end of the bracket 14 and has a suitably inclined or conical surface 26 to frictionally engage a complementary surface 27 on the under side of the collar 16. The inclination of these surfaces is such that when engaged the shaft 9 is frictionally connected with the arms 17, and when the shaft is rotated by the motor 13, the tub is turned to effect washing of the clothing therein. Should the tub be overloaded, the friction drive between the sleeve 21 and the collar 16 would be overcome and the sleeve would merely slip and thus prevent blowing out of the motor.

The tub 18 is open at the top, and operating in it to effect proper washing of the garments are a plurality of pounders 28. Each pounder 28 is secured to the lower end of a rod 29 projecting below and slidably mounted in a bracket 30 depending from the under side of a cross-bar 31 provided at one end with a plate 32 having fixed pins 32$^a$ to be mounted in apertures or holes in a gear case 33 on an upright tube 34 supported by the stand 1. The other end of the bar 31 rests on an upright standard 35 at the opposite side of the machine and secured to said stand. A removable pin 35$^a$ holds the bar on said standard.

Extending along the bar 31 above the same are alined sections of a shaft 36 journaled in upright standards 37 on said bar. The shaft 36 has crank arms 38 connected by pitmen 39 to the upper ends of the respective rods 29. Each rod 29 carries a cross-head 40 to slide up and down in the associated bracket 30 during the reciprocation of the pounders. The bar 31 is formed to provide protecting yokes 41 at the crank arms, as shown in Fig. 2.

Extending into the gear box 6 is a horizontal shaft 42 having at its inner end a beveled gear pinion 43 in mesh with a beveled gear 44 on the shaft 9, the latter extending downward through said gear wheel and supported and journaled in an upright post 45. The outer end of the shaft 42 extends beyond one side of the stand 1 into a gear case 42$^a$ and is there provided with a beveled gear 46 in mesh with a beveled gear 47 on a vertically arranged shaft 48 in the upright tube 34. The gear case 33 at the top of the tube has journaled in it a short shaft section 49, horizontally arranged, in alinement with and adapted to have detachable connection with the shaft 36. This connection may be made in any suitable manner, as by providing one shaft with a tongue 36$^a$ to enter a slot 49$^a$ in the other shaft, as shown in Figs. 2 and 4. The shaft 49 has a beveled gear 50 in mesh with a beveled gear 51 loosely mounted on the portion of the shaft 48 extending through the gear case 33. Splined on the shaft 48 in the gear case 33 is a clutch sleeve 52 adapted to be moved into and out of clutch with pins on the gear wheel 51 by a lever 53 on the outside of said case, as shown in Fig. 4. The gear case has an upwardly extending portion 33$^a$, in which the upper portion of the shaft 48 is journaled, and rotatably mounted on said extension is another gear case 54, in which is a beveled gear 55 fixed on the shaft 48. This gear wheel meshes with a beveled gear 56 on a shaft 57 carrying one of the rolls of the wringer 58. The wringer is secured to the gear case 54 by a bracket 59. By the construction described, the wringer may be swung manually about the shaft 48 when it is desired to wring into or out of the tub or to swing the wringer into an inoperative position.

The mechansm shown and described operates as follows. The tub 18 is placed on the arms 17 and then the pounders are placed in the tub and supported in position to operate. The clutch lever 23 being inside of the latch 25 holds the sleeve 21 out of clutch with the collar 16. To impart rotation to the tub, the clutch lever 23 is pulled outward away from the catch and the sleeve 21 is moved into frictional engagement with the collar 16, the weight 23$^a$ on said lever holding the sleeve 21 in frictional engagement, and the tub is rotated upon starting the motor. Through the gearing in the box 6 and the shafts 42, 48 and 49, the shaft 36 is rotated to reciprocate the pounders 28 while the tub is rotated, the clutch sleeve 52 being in clutch with the gear wheel 51. As shown in Fig. 8, the lower end of the pounder rod 29 is bent slightly away from the vertical so that the bottom edge of each pounder is inclined at an angle to the bottom of the tub, the inclination being in the direction of rotation of the tub, as indicated by the arrow in Fig. 8. By this arrangement the pounding effect of the pounders in moving toward the bottom of the tub is to turn the clothing over and thus effect a complete circulation of water about all sides of the clothes. The tub rotating carries the clothing therewith and insures every spot of the clothes coming under the pounders so that the pounders will not work on one spot at all times. To throw the pounders out of operation, the clutch sleeve 52 is moved downward to disconnect the gear wheel 51 from the shaft 48, and to stop the tub from rotating the clutch lever 23 is moved back behind the clutch 25.

After the washing has been completed, or should it be desired to remove the pounders from the tub before that time, the pounders are thrown out of clutch with the shaft 49 and the tub stopped. The bar 31 is then disconnected from the standard 35 by removing the pin 35$^a$ and shifted upward and moved to withdraw the pins 32$^a$ from the gear case 33. The bar 31 is then free of the machine and may then be lifted upward to clear the pounders carried thereby of the tub. The shafts 36 and 49 readily disconnect to allow this to be done.

To operate the wringer, the same is swung into the position desired until the lugs 60 on the under side of the gear case 54 drop into the complementary notches 61 at the upper end of the stationary extension 33$^a$. This brings the gear wheel 56 into mesh with the gear wheel 55 and through the shaft 48 the wringer rolls will be rotated. When the wringer is in the position shown in Fig. 1, it is connected with the motor and operated by the gearing described and is over the tub to wring into the same. To disconnect the wringer from the motor, it is merely necessary to swing the wringer to one side of the tub, whereupon the lugs 60 will ride out of the notches 61 and come to rest on the upper surfaces between the notches and there seat in the shallow recesses 62 to hold the wringer from accidental swinging, as shown in Fig. 9. This movement raises the wringer bodily upward and therefore carries with it the gear wheel 56 and moves it out of mesh with the gear wheel 55. By this construction, no shiftable clutch member is required to throw the wringer into and out of gear, and further the wringer when in gear is held in a fixed position and consequently there is no chance of the wringer being swung around when thrown into gear and hitting and injuring the person standing at and using the machine. When the wringer is swung around from the position shown in Fig. 1 to a position outside of the tub and opposite to the position of Fig. 2, the lugs are in the notches and the wringer in gear for wringing outside of the tub. When swung into quarter positions, the wringer is raised out of gear.

To insure a thorough agitation of the water in the tub during the washing operation, I provide a blower 63, supported on a cross-bar 64 secured to the lower frame of the base or stand 1. The shaft of this blower has a gear pinion 65 in mesh with a gear wheel 66 on the armature shaft 12. To the outlet end of the blower is connected a pipe 67, which extends up along the outside of the tub and is secured by clamps or suitable means to the standard 35. This pipe turns at its upper end over the tub and then extends down into the same to a point near the bottom, where it has a discharge opening arranged to discharge a current of air in the general direction of rotation of the tub, as shown in dotted lines in Fig. 1.

The tubular standard 34 is braced by a yoke shaped bracket 68 secured to the base 1, as shown. The catch 25 is secured to the standard 34 and the clutch shifting lever 23 extends upward from under the tub alongside of this standard.

While I have shown and described herein in detail a construction embodying the features of my invention, it is to be of course understood that the details of construction and arrangement of parts may be variously changed and modified without departing from the spirit and scope of my invention.

I claim as my invention:

1. In a gearing of the character described, the combination of a stand, an upright main operating shaft rotatably mounted on said stand, a rotary driven member supported in horizontal position above said stand and loose on the upper end of said shaft, a motor on said stand, a power transmitting connection between said motor and said shaft, and a clutch sleeve splined on said shaft below said rotary member and adapted to be moved into and out of frictional clutched engagement with said rotary member.

2. In a gearing of the character described, the combination of a stand, an upright main operating shaft rotatably mounted on said stand, a rotary driven member supported in horizontal position above said stand and loose on the upper end of said shaft, a motor on said stand, a power transmitting connection between said motor and said shaft, and a clutch sleeve splined on said shaft below said rotary member and having a conical clutch surface adapted to be moved into and out of frictional clutched engagement with a complementary conical clutch surface on said rotary member.

3. In a gearing of the character described, the combination of a stand, an upright main operating shaft rotatably mounted on said stand, a rotary driven member supported in horizontal position above said stand and loose on said shaft, a worm gear on said shaft below said rotary member, a motor on said support, a worm driven by the armature shaft of the motor and in mesh with said worm gear, and a clutch sleeve splined on the main operating shaft between said worm gear and said rotary member and adapted to be moved into and out of frictional clutched engagement with said rotary member.

4. In a gearing of the character described, the combination of a stand, a gear box on said stand, an upright main operating shaft journaled in said box and extending above the same, a rotary driven member supported in horizontal position by said box and above the same and loose on said shaft, a worm gear in said box and fixed to said shaft, a motor on said support at one side of said box and having an armature shaft extending into the same, a worm in said box and in mesh with said worm gear and driven by said armature shaft, and a clutch sleeve splined on said main operating shaft between said box and said rotary member, and adapted to be moved into and out of frictional clutched engagement with said rotary member.

5. In a gearing of the character described, the combination of a stand, an upright main operating shaft rotatably mounted on said stand, a rotary driven member supported in horizontal position above said stand and comprising spider arms and a collar secured to the under side thereof, said member being loose on said shaft, a worm gear on said shaft below said rotary member, a motor on said stand, a worm driven by the armature shaft of the motor and in mesh with said worm gear, and a clutch sleeve splined on the shaft between said worm gear and said collar and adapted to be moved into and out of frictional clutched engagement with said collar.

6. In a gearing of the character described, the combination of a stand, an upright main operating shaft rotatably mounted on said stand, a rotary driven member supported in horizontal position above said stand and loose on said shaft, a motor on said support, a power transmitting connection between said shaft and said motor, a clutch sleeve splined on said operating shaft and adapted to be moved into and out of clutched engagement with said rotary member, a counter shaft horizontally arranged above said rotary member, a vertically arranged rod between said counter shaft and said rotary member and adapted to carry a pounder at its lower end, means connecting the upper end of said rod with said counter shaft to reciprocate said rod on the rotation of said counter shaft, and a power transmitting connection between said operating shaft and said counter shaft.

7. In a gearing of the character described, the combination of a stand, an upright main operating shaft rotatably mounted on said stand, a rotary driven member supported in horizontal position above said stand and loose on said shaft, a motor mounted on said support, a power transmitting connection between said motor and said shaft, a clutch sleeve splined on said operating shaft and adapted to be moved into and out of frictional clutched engagement with said rotary member, a counter shaft horizontally arranged above said rotary member, a vertical rod between said counter shaft and said rotary member, a crank arm and pitman connecting the upper end of said rod with said counter shaft for imparting reciprocation to said rod on the rotation of said counter shaft, a power transmitting connection between said main operating shaft and said counter shaft, and a clutch in said power transmitting connection for connecting and disconnecting said counter shaft to and from said operating shaft.

8. In a gearing of the character described, the combination of a stand, an upright shaft rotatably mounted on said stand, a rotary driven member supported in horizontal position above said stand and loose on said shaft, a motor on said stand, a power transmitting connection between said motor and said shaft, a counter shaft horizontally arranged above said rotary member and supported by said stand, a vertical rod between said counter shaft and said stand and adapted to carry a pounder at its lower end, a crank arm and pitman connecting the upper end of said rod with said counter shaft for reciprocating said rod on the rotation of said counter shaft, a second shaft vertically arranged and supported by said stand, meshing gear wheels, one fixed to said second shaft and the other to said counter shaft, a clutch sleeve splined on said second shaft and adapted to be moved into and out of clutched engagement with the gear wheel fixed thereon, and a power transmitting connection with said second shaft and said main operating shaft.

9. In a gearing of the character described, the combination of a stand, an upright main operating shaft rotatably mounted on said stand, a rotary driven member supported in horizontal position above said stand and loose on said shaft, a clutch sleeve splined on said shaft and adapted to be moved into and out of frictional clutched engagement with said rotary member, a motor on said stand, a power transmitting connection between said motor and said shaft, a counter shaft horizontally arranged above and supported by said stand, a vertical rod between said counter shaft and said stand and adapted to carry a pounder at its lower end, a crank arm and pitman connecting the upper end of said rod with said counter shaft to reciprocate said rod on the rotation of said counter shaft, a second shaft vertically arranged and supported by said stand, meshing gear wheels, one fixed to said second shaft and the other fixed to said counter shaft, a clutch sleeve splined on said second shaft and adapted to be moved into and out of clutched engagement with the gear wheel fixed thereon, a horizontal shaft supported by said stand and having power transmitting connection at one end with said main operating shaft and at the other end with said second shaft.

10. In a gearing of the character described, the combination of a stand made of upper and lower open frames of angle-bars connected together at the corners thereof, a rotary driven member horizontally arranged above said stand and adapted to support a tub, a gear box on said stand between said frames, an upright main operating shaft journaled in said gear box and projecting above the same and extending loose into said rotary member, a motor on said stand between said frames and located close to the same, said motor having an armature shaft extending into said gear box, meshing gear wheels in said gear box to provide power transmitting connection between said armature and main operating shafts, and a sleeve splined on the main operating shaft between said rotary member and gear box and adapted to be moved into and out of frictional clutched engagement with said rotary member.

11. In a gearing of the character described, the combination of a stand, an upright main operating shaft rotatably mounted on said stand, a rotary driven member supported in horizontal position above said stand and loose on the upper end of said shaft and adapted to support a tub, a motor on said stand, a power transmitting connection between said motor and said shaft, a clutch sleeve splined on said shaft below said rotary member and having a conical clutch surface adapted to be moved into frictional clutch engagement with the complementary conical clutch surface on said rotary member, an operating lever pivoted on said stand and connected with said sleeve for moving the same into and out of clutch engagement with said rotary member, and a weighted member on said lever for holding said clutch surfaces in contact when engaged.

In testimony that I claim the foregoing as my invention, I affix my signature this 1st day of October, A. D. 1920.

CHARLES CALVERT LAMB.